US005580654A

United States Patent [19]

Cotter et al.

[11] Patent Number: 5,580,654

[45] Date of Patent: Dec. 3, 1996

[54] INSULATED ELECTRICAL CONDUCTOR

[75] Inventors: Mark A. Cotter, Middletown, Del.; David Zuckerbrod, Baltimore, Md.; Matt C. Kesler, Phoenix; J. Scott Reynolds, Tempe, both of Ariz.

[73] Assignee: W. L. Gore & Associates, Inc., Newark, Del.

[21] Appl. No.: 576,860

[22] Filed: Dec. 15, 1995

Related U.S. Application Data

[62] Division of Ser. No. 394,316, Feb. 22, 1995, abandoned.

[51] Int. Cl.[6] .......... B32B 9/00

[52] U.S. Cl. .......... 428/375; 428/378; 428/389; 428/209; 204/450; 204/477; 204/476

[58] Field of Search .......... 428/375, 378, 428/389, 209; 204/450, 471, 476

[56] References Cited

U.S. PATENT DOCUMENTS

| | | | |
|---|---|---|---|
| 3,616,389 | 10/1971 | Onishi | 204/181 |
| 4,526,806 | 7/1985 | Haque et al. | 427/41 |
| 4,800,526 | 1/1989 | Lewis | 365/118 |
| 5,034,801 | 7/1991 | Fischer | 428/422 |

*Primary Examiner*—Patrick Ryan
*Assistant Examiner*—Cathy K. Lee
*Attorney, Agent, or Firm*—Victor M. Genco, Jr.

[57] ABSTRACT

An improved electrical conductor is provided which includes an electrical conductor having an insulating layer which electrically insulates the electrical conductor. The insulating layer is substantially pinhole free having a thickness of less than about 30 μm.

6 Claims, 6 Drawing Sheets

INSULATED ELECTRICAL CONDUCTOR

FIELD OF THE INVENTION

This is a divisional application of Ser. No. 08/394,316, filed Feb. 22, 1995, now abandoned.

This invention generally relates to an improved electrical conductor. More particularly, the present invention relates to an electrical conductor having an insulation which has a thickness substantially less than the cross-sectional dimension of the electrical conductor, and to a method for producing such an electrical conductor.

BACKGROUND OF THE INVENTION

It is desirable to connect certain electronic components, such as but not limited to disc drive read/write heads and amplifiers for example, in a manner which minimizes the inductance of the interconnect. Lower inductance is desirable to increase the operational frequency of such electronic components. For example, in a conventional disc drive for a personal computer, the operational frequency of the read/write head is a function of the inductance of the circuit comprising the head, the conductors, the amplification device, and perhaps other interconnection components. Specifically, a read function of a disc drive can be modeled as a low-pass filter. The read frequency at which a signal is dramatically attenuated is inversely proportional to the total circuit inductance, of which the inductance of the insulated conductors is a major factor. Accordingly, a decrease in the inductance of the insulated conductors of the disc drive circuit results in a similar decrease in the total circuit inductance, and a nearly proportional increase in the allowable read frequency. This of course increases the quantity of data which can be read per unit of time. A similar effect may also occur with a write function of a disc drive.

A common type of interconnect for a disc drive is a parallel or twisted thin wire pair. The individual coated wires of this wire pair typically have a diameter of about 35 μm, which corresponds to an AWG of 48. These wires may carry a balanced (or differential) signal pair, or may provide a signal path and a return path for a single-ended signal. The inductance of a conventional disc drive circuit may be significantly decreased by insulating the individual wires of the circuit with an extremely thin layer of insulation.

In addition to the apparent need for conductors having extremely thin insulation for the purpose of reducing inductance, many electronic devices, such as modem medical devices for example, require electrical conductors of extremely small dimensions. Such conductors may have a diameter of less than 25 μm, which would correspond to an AWG of 52 or less. Often these conductors must be insulated with a material having a uniform thickness which is much less than the nominal cross-sectional dimension of such conductors.

Conventional insulation methods, such as extrusion and tape wrapping, work with reasonable success when the required insulation thickness is not much less than the cross-sectional dimensions of the conductor. However, these methods are not suited for insulating conductors having extremely small dimensions with a uniform layer of insulation having a thickness which is substantially less than the cross-sectional dimension of the conductor itself. For example, as the insulation thickness is reduced, any displacement between the axis of a conductor and the axis of the insulation results in unacceptable variations in the thickness of the insulation and/or exposed conductor surface. Accordingly, extrusion processes are not effective to achieve a uniform layer of insulation of substantially less than 0.001 inches. Additionally, in a tape wrapping insulation process, the insulation thickness of a single layer of tape is limited by the tensile strength of the tape. Excessive reductions in the thickness of the tape produces a tape which is too weak to be handled by readily available equipment and methods. Accordingly, tape wrapping processes are limited to insulation thicknesses of about 0.001 inches or larger. Conventional tape wrapping machines are also not designed to manipulate extremely thin conductors, such as AWG 52 sized wires, without damaging these extremely thin conductors. Dip-coating processes have also been used to apply insulation to conductors. This method is somewhat conformal, but the thickness which can be achieved is limited by the viscosity and surface tension of the solution and by other process parameters. Also, a dip-coating process is not particularly effective for insulating an extremely thin conductor with a substantially pinhole free layer of insulation having a thickness of less than about 30 μm.

In addition to the foregoing, U.S. Pat. No. 3,616,389 discloses a process for insulating a conductor by electrophoretically precipitating an insulating coating from a water dispersion of a resin varnish onto the surface of a conductor. By use of this process, insulation coatings having a thickness of from 30 microns to 500 microns were claimed to have been achieved. Although these coatings may have operated with varying degrees of success, there is a need to provide an electrical conductor having an insulation thickness of substantially less than 30 microns to minimize the inductance of an electrical circuit. Additionally, there is a need to provide an electrical conductor having an insulation thickness which is substantially less than the cross-sectional dimension of the electrical conductor.

The foregoing illustrates limitations known to exist in present insulated conductors. Thus, it is apparent that it would be advantageous to provide an improved insulated electrical conductor directed to overcoming one or more of the limitations set forth above. Accordingly, a suitable alternative is provided including features more fully disclosed hereinafter.

SUMMARY OF THE INVENTION

The present invention advances the art of insulated electrical conductors, and the techniques for creating such conductors, beyond which is known to date as described above. In one aspect of the present invention, this is accomplished by providing an article which includes an electrical conductor having an insulating layer which electrically insulates the conductor. The insulating layer is substantially pinhole free having a thickness of less than about 30 μm. The insulating layer may comprise a fluoropolymer resin, an acrylate resin, polytetrafluoroethylene, fluorinated ethylenepropylene, polybutylmethacrylate, fluoromethacrylate, or perfluoroalkoxy polymer.

In another aspect of the present invention a method is provided for making an insulated conductor. The method comprises the following steps:

- providing a microemulsion consisting of from about 5 to about 38% solids by weight with an average particle size ranging from about 0.01 to about 0.06 μm;
- electrophoretically precipitating a uniform substantially pinhole free insulation layer having a thickness of less than about 30 μm about the conductor;
- heating said insulation layer until dried; and sintering the insulation layer.

The method of the present invention is particularly useful for insulating a an irregularly shaped conductor with a uniform, substantially pinhole free layer of insulation, of the type described herein, by preferentially coating exposed metal surfaces of such a conductor due to local concentrations in the electric field.

The foregoing and other aspects will become apparent from the following detailed description of the invention when considered in conjunction with the accompanying drawing figures.

DETAILED DESCRIPTION OF THE INVENTION

A fundamental structural unit that forms the basis of all embodiments of this application is an electrical conductor which is generally illustrated at 10 in FIGS. 1–8. Electrical conductor 10 supports an insulation layer 12 having a thickness substantially less than the cross-sectional dimension of the electrical conductor 10. By way of example only, the electrical conductor 10 of FIGS. 1–8 has a diameter of about 45 microns.

Figure 1:
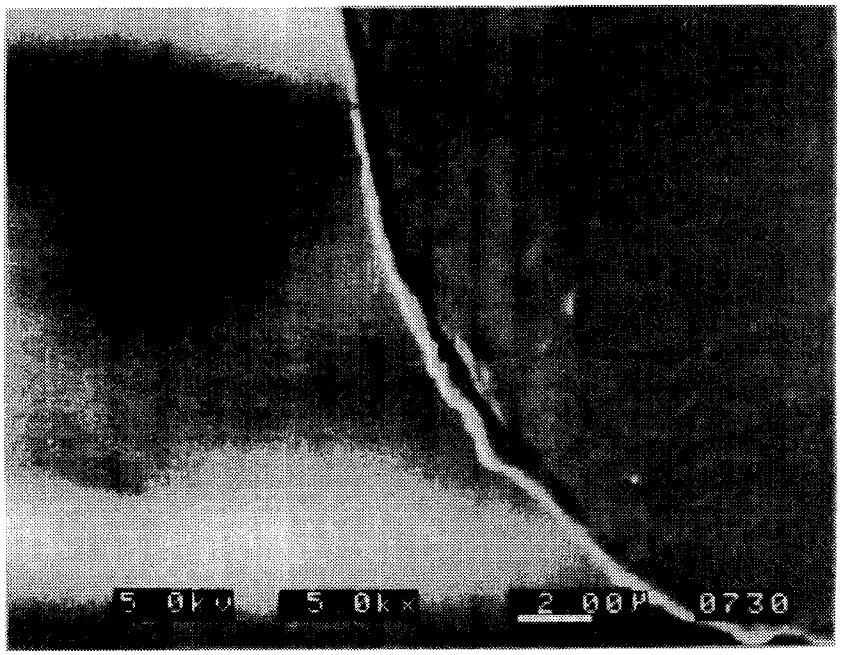
FIG. 1 is a scanning electron micrograph, at a magnification of 5000×, of a conductor having an insulation layer of polybutylmethacrylate in accordance with one embodiment of the present invention.
Figure 2:
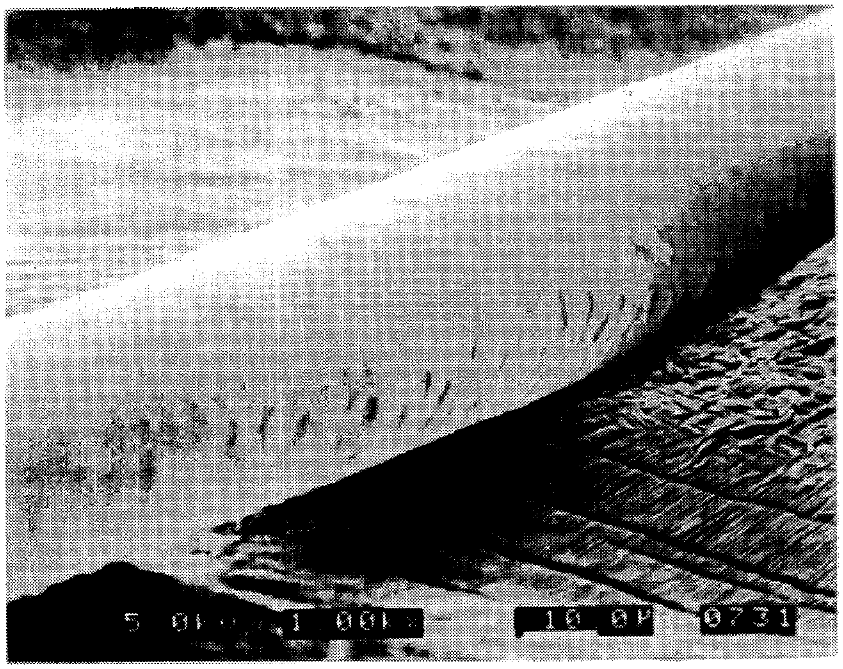
FIG. 2 is a scanning electron micrograph, at a magnification of 1000×, of the conductor of FIG. 1.
Figure 3:
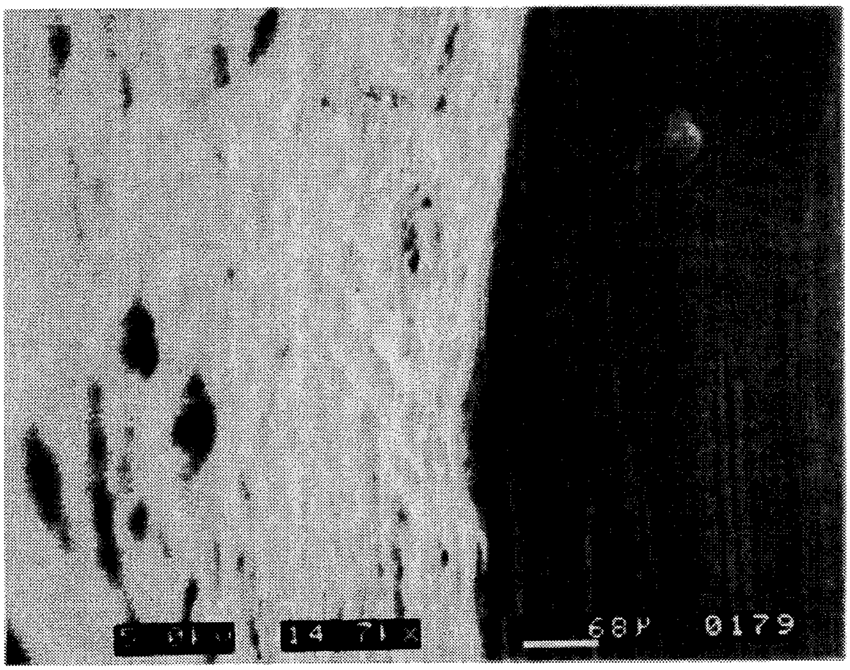
FIG. 3 is a scanning electron micrograph, at a magnification of 14700×, of a conductor having an insulation layer of polytetrafluoroethylene in accordance with one embodiment of the present invention.
Figure 4:
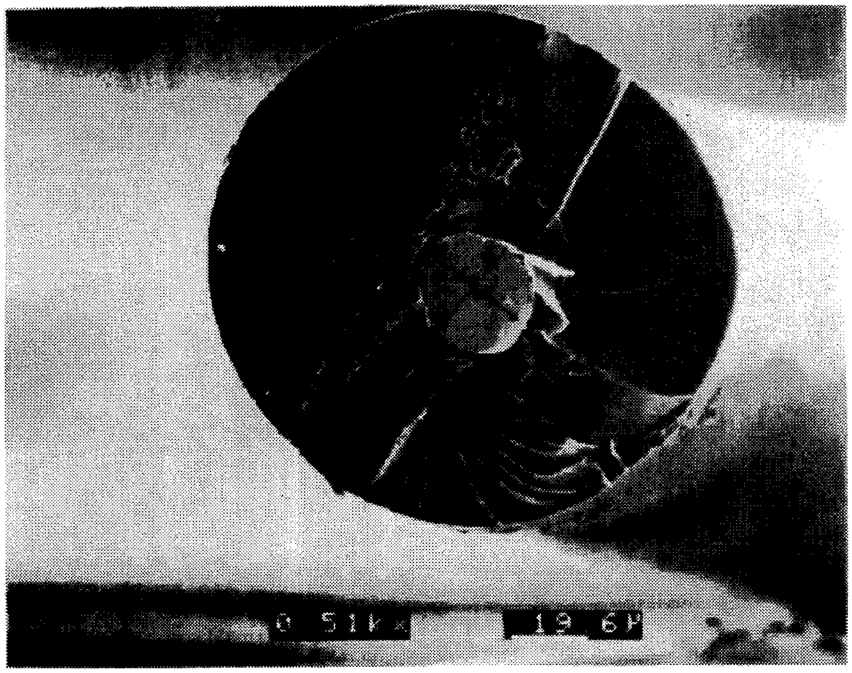
FIG. 4 is a scanning electron micrograph, at a magnification of 510×, of a conductor having an insulation layer of polytetrafluoroethylene in accordance with one embodiment of the present invention.
Figure 5:
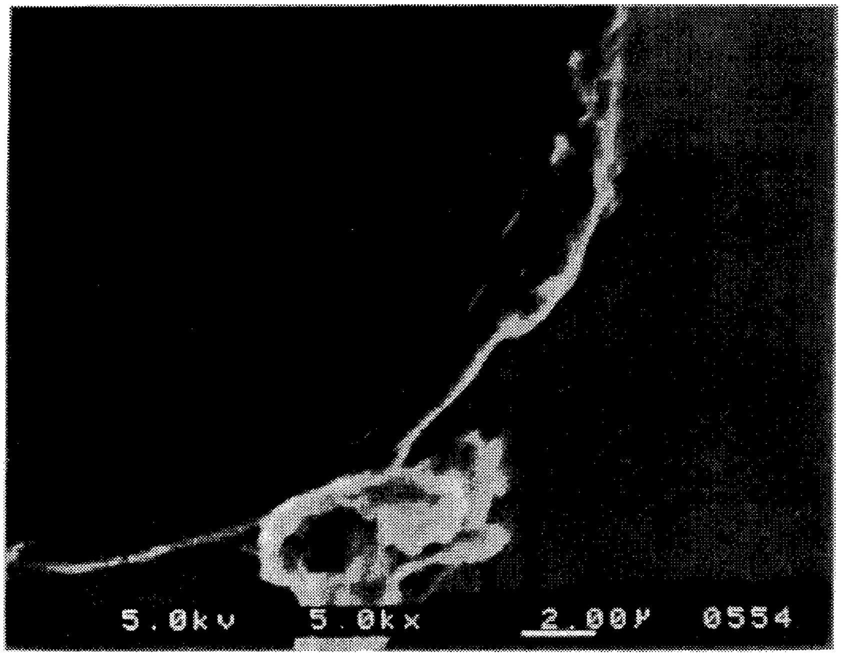
FIG. 5 is a scanning electron micrograph, at a magnification of 5000×, of a conductor having an insulation layer of fluoromethacrylate in accordance with one embodiment of the present invention.
Figure 6:
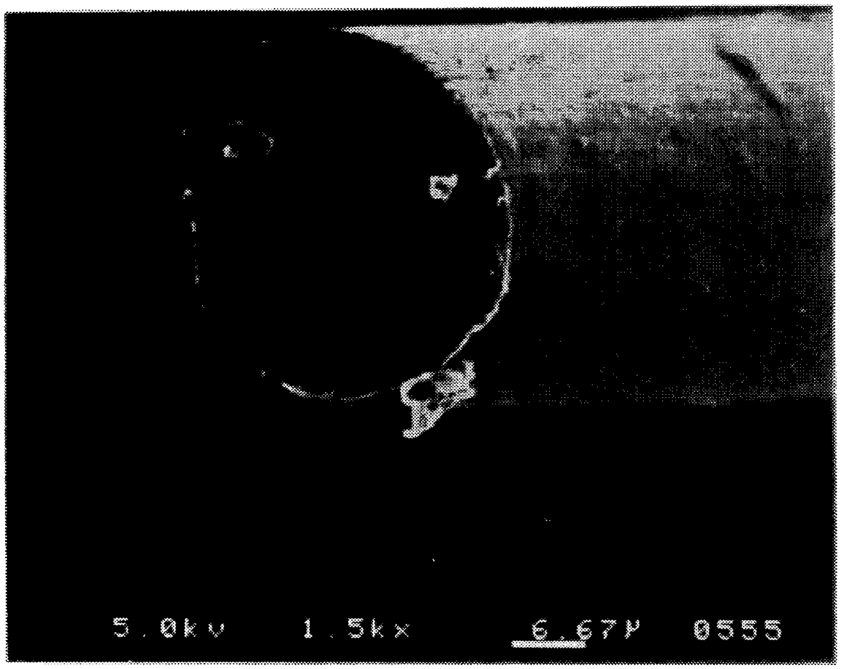
FIG. 6 is a scanning electron micrograph, at a magnification of 1500×, of the conductor of FIG. 5.
Figure 7:
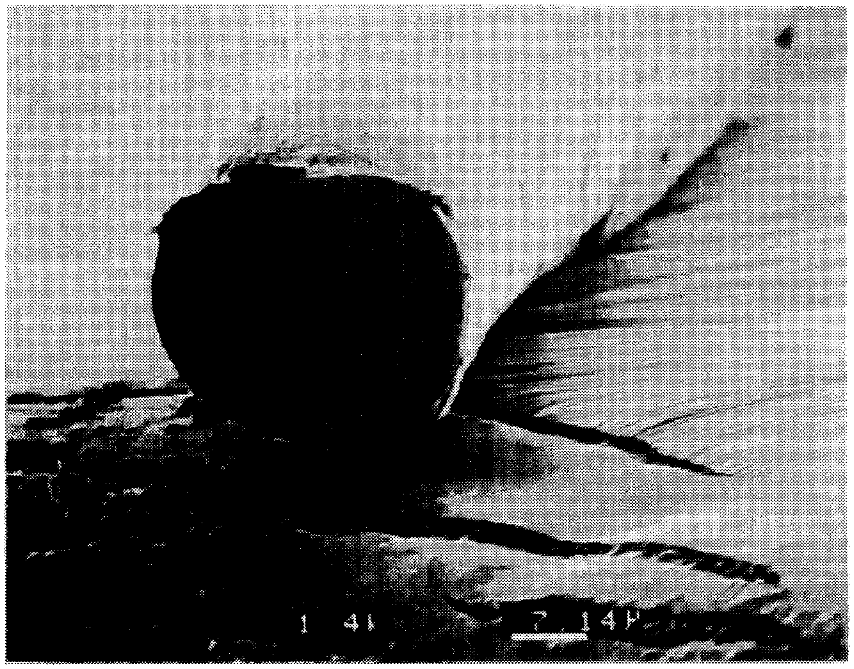
FIG. 7 is a scanning electron micrograph, at a magnification of 1400×, of a conductor having an insulation layer of fluorinated ethylenepropylene in accordance with one embodiment of the present invention.
Figure 8:
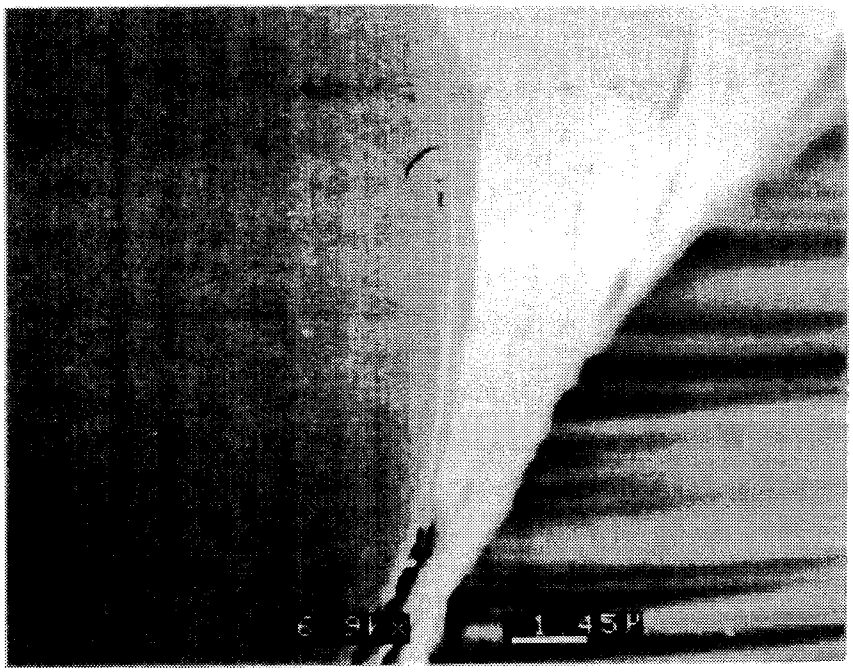
FIG. 8 is a scanning electron micrograph, at a magnification of 6900×, of the conductor of FIG. 7.
Figure 9:
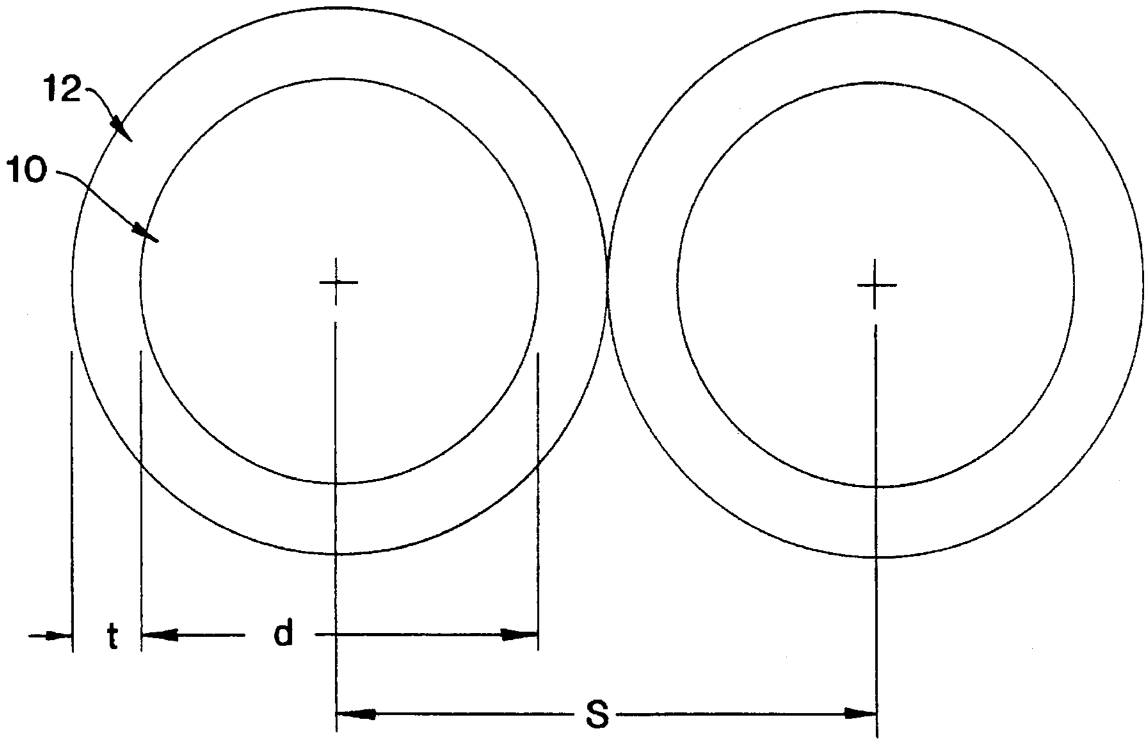
FIG. 9 is a schematic representation of a wire pair.
Figure 10:
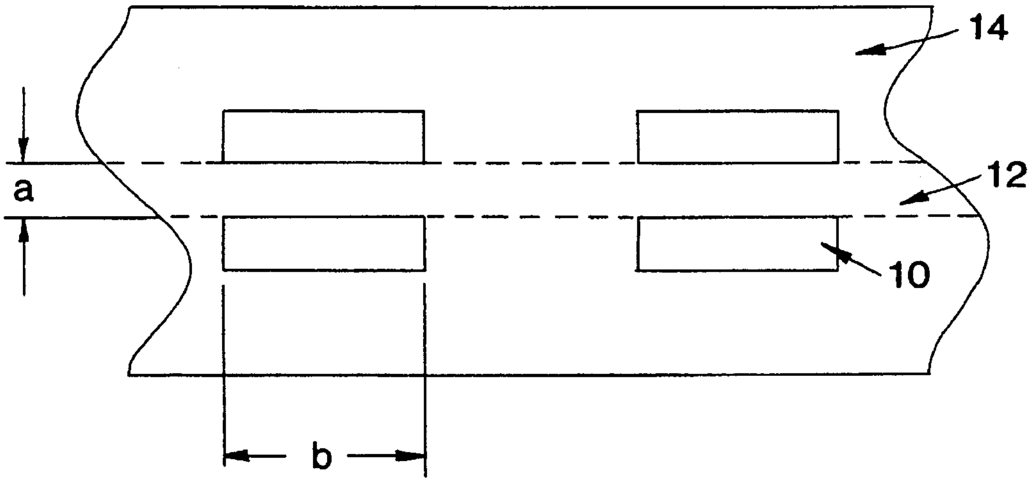
FIG. 10 is a schematic representation of a ribbon cable.
Figure 11:
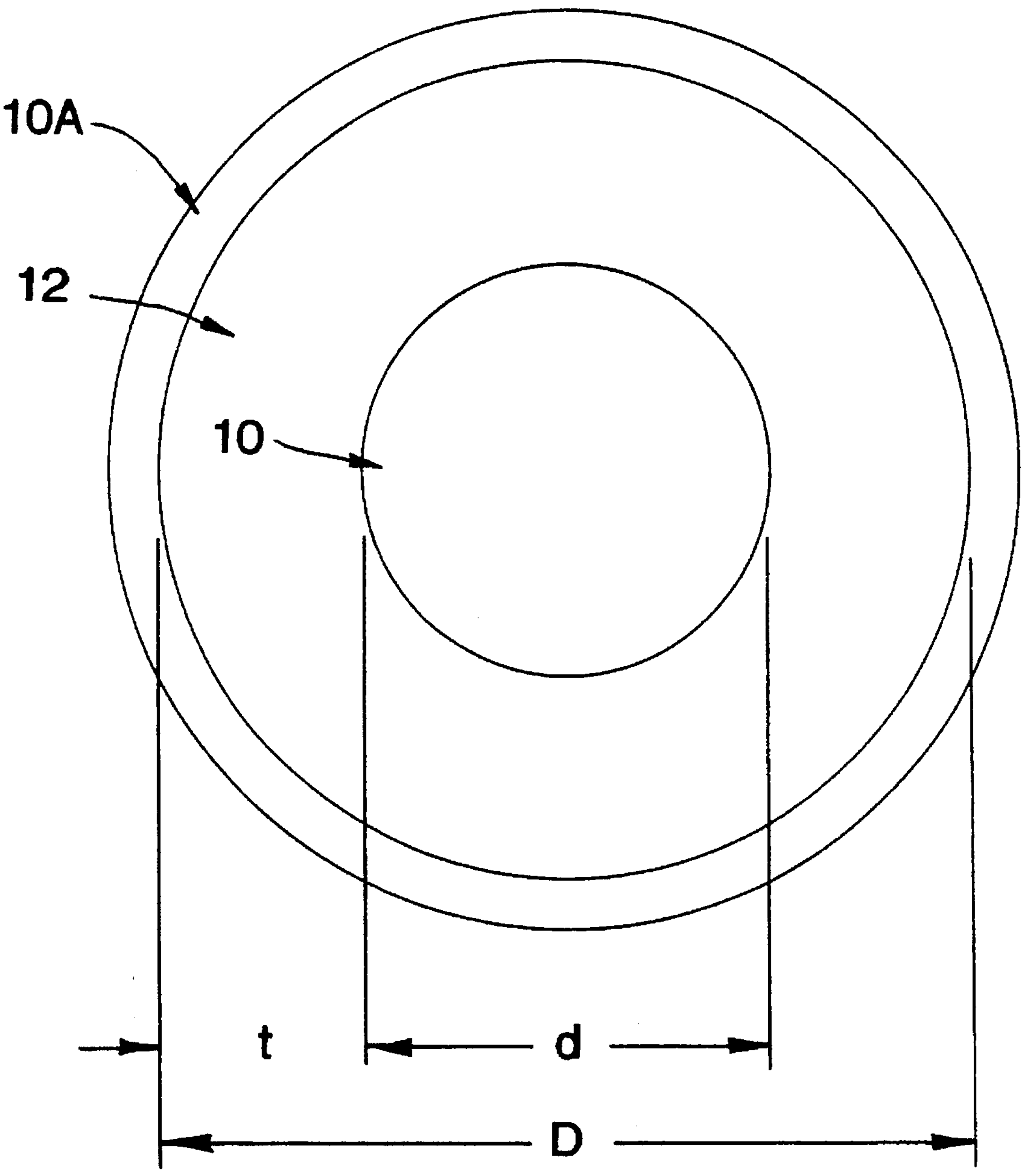
FIG. 11 is a schematic representation of a coaxial cable.

As best seen by reference to FIGS. 9–11, the electrical conductor 10 may be defined by any shape and may be integrated into any conductor assembly. FIG. 9 illustrates a wire pair having conductors 10 and insulation layers 12. FIG. 10 illustrates a ribbon cable having conductors 10, a dielectric layer 12, and insulation 14. FIG. 11 illustrates an inner conductor 10, a layer of insulation 12 and an outer conductor 10A.

The improved insulated electrical conductor of the present invention operates to reduce the inductance of the interconnects within a circuit, such as a disc drive circuit for example. As described hereinabove, in a typical disc drive circuit, a read/write head is connected to an amplification device by way of a wire pair. Referring to FIG. 9, the inductance (L) of a wire pair is given in the following expression:

$$L \approx (\mu/\pi)\cdot \cosh^{-1}(s/d),$$

where

μ is the permeability of both the insulation of the conductors and of the surrounding medium (assumed to be equal):

$\pi \approx 3.14159$;

$\cosh^{-1}$is the inverse hyperbolic cosine function;

s is defined by FIG. 9, and d is defined by FIG. 9.

π cannot be changed. L can be decreased by increasing d, or by decreasing s or μ. The relationship between L and d is relatively insensitive. Other factors kept constant, a large increase in d is needed to produce a small reduction in L. A large increase in d is undesirable in such applications as disc drives due to increased cost, weight, and stiffness. μ can be changed only by a change in the insulation material and/or a change in the surrounding medium. Known materials would not decrease p enough to produce significant reduction in L. Therefore, it is apparent that decreasing s would be desirable to decrease L.

The term s is defined by the expression $s=d+2t$, where t is the thickness of the insulation. Thus $$\frac{s}{d} = \frac{d+2t}{d} = 1 + \frac{2t}{d}$$

Given that t is much less than d, a small reduction in t can produce a significant reduction in L. For example, a fifty percent reduction in the thickness of insulation 12 of conductor 10 would produce about a forty four percent reduction in inductance. However, the insulation 12 must be continuous, covering all surface of the conductor 10 such that there will be no short-circuits between the two conductors 10 of the wire pair. It is thus desirable that the process by which the insulation is applied be such that the insulating material preferentially coats bare conductor rather than nonconductive surfaces, so that a uniform, continuous layer will be applied to all points on the conductor surface with minimal thickness at any point.

Referring to FIG. 10, inductance may also be reduced by changing the cross-section of a ribbon cable. In this case, inductance (L) is given by the expression $$L \approx (\mu\cdot(a/b)),$$

where a and b are defined as illustrated by FIG. 10.

This type of conductor construction theoretically allows an unlimited reduction in L, since b can be increased virtually without limit. However, practical considerations such as two-dimensional flexibility, for example, may impose some upper limit on b. Therefore, reductions in the insulation thickness may be desirable. The teaching of the present invention enables a thin, continuous, uniform layer of insulation to be deposited on the conductors which results in a reduced inductance.

In the coaxial type conductor assembly of FIG. 11, inductance is given by the expression $$L \approx (\mu/2\pi)\cdot \ln(D/d),$$

where In is the natural logarithm function and the dimensions D and d are as given by FIG. 11.

Again, the teachings of the present invention provide a thin, continuous, uniform insulation layer which produces a lower D/d ratio, and thus reduced inductance.

The insulated electrical conductor of the present invention is created by an electrophoretic process which employs a bath containing a microdispersion or microemulsion, such as a fluoropolymer or acrylate microemulsion, which may include, but is not limited to, microemulsions of polytetrafluoroethylene (PTFE), fluodnated ethylenepropylene (FEP), polybutylmethacrylate (PBM), fluoromethacrylate (Fac), or perfluoroalkyl polymer (PFA).

As used herein, a microemulsion or microdispersion means a stable isotropic mixture of resin, water, and surfactant which forms spontaneously upon contact of the ingredients. Other components, such as salt or cosurfactant (such as an alcohol, amine, or other amphiphilic molecule) may also be part of the microemulsion formulation. The resin and water reside in distinct domains separated by an interfacial layer rich in surfactant. Because the domains of resin or water are so small, microemulsions appear visually transparent or translucent. Unlike emulsions, microemulsions are equilibrium phases. A microemulsion can be distinguished from a conventional emulsion by its optical clarity, low viscosity, small domain size, thermodynamic stability, and spontaneous formation.

The thickness of the layer of insulation 12 which is deposited on the conductor 10 is controlled by the amount of charge applied during the electrophoretic process. The amount of charge is controlled by applying a fixed voltage and monitoring the integral of the current with respect to time. The layer of insulation 12 provided by the present invention has a thickness substantially less than the cross-sectional dimension of the conductor 10. Insulation thicknesses of from about 0.2 μm to about 200 μm may be achieved in accordance with the teachings herein. Insulation thicknesses of less than 0.2 m may also be achieved. The present invention contemplates an insulation thickness of about the particle size of a predetermined microemulsion.

A bath of a microemulsion may be contained by any suitable container, and is fitted with an inert, cylindrically shaped counter electrode which may be made of any suitable material, such as nickel for example. In the case of providing an insulation for a wire, the counter electrode is disposed concentrically about the wire to be insulated. For insulating conductors having an irregular shape, the counter electrode should be shaped to provide a uniform current distribution about the conductor to be insulated. A DC power supply provides the current needed to charge the wire to be insulated. An electrical connect is provided to the wire (charged positive for emulsions with an anionic surfactant) and to the counter electrode (charged negative). Both a batch process and a continuos process may be employed to insulate a conductor in accordance with the teachings herein.

In the case of a batch process, a tube may contain the microemulsion bath. A wire to be insulated may be suspended from an electrically isolated support assembly into the tube. The wire may be suitably positioned using an inert weight attached to a free end of the wire. After the electrophoretic process has been completed, the wire is withdrawn from the bath and is placed into a furnace to be dried. Thereafter, the coating is sintered near the melting point of the particular resin used in the electrophoretic process.

In the case of a continuous process, a tank may contain the microemulsion bath. A tube, having the counter electrode disposed therein may be positioned in the tank. The wire to be insulated may be paid off a spool, or other type support assembly, and into the bath. The wire may pass along an axis of the tube where it is coated. The applied current can be varied in proportion to the line speed to provide a coating of uniform thickness. The wire may then be withdrawn from the bath and passed through a furnace to be dried. Thereafter, the coating is sintered near the melting point of the particular resin used in the electrophoretic process.

With only slight modifications to these processes, multiple conductors could be coated simultaneously. Also, the bath could be fitted with several payoff spools. Additionally, and with the wires held in their proper spatial relationship, all wires could be coated simultaneously to form a monolithic cable after drying and sintering. Alternatively, each wire could be coated with an individual counter electrode and then dried and sintered as a group to form a monolithic cable.

By filling the batch with a mixture of two or more microdispersions, mixed structures can be deposited. For instance, a mixture of an FEP and a PTFE microdispersion would provide the excellent adhesion properties of the FEP and the dielectric properties of PTFE. Similarly, any microdispersion of negatively charged particles could be mixed with a fluoropolymer microdispersion to form a mixed deposit with the desired mechanical, electrical or physical properties.

Conductors insulated in accordance with the teachings of the present invention have a continuous and an extremely uniform insulation thickness, substantially free of pinholes. As a result of the present invention, an electrical conductor may be provided with a layer of insulation having a thickness of less than about 30 μm. Additionally, the electrical conductor may be provided with a layer of insulation which is substantially less than the cross sectional dimension of the electrical conductor.

Without intending to limit the scope of the present invention, microdispersions which may be used to produce an insulation 12 for an electrical conductor 10 in accordance with the teachings of the present invention are described in detail hereinafter.

MICROEMULSION POLYMERIZATION PROCEDURE FOR PRODUCING SMALL PARTICLES OF POLYTETRAFLUOROETHYLENE

An aqueous microemulsion polymerization procedure produces unusually small particles of polytetrafluoroethylene (PTFE). During this procedure, the polymerization of tetrafluoroethylene (TFE) gas is carried out in the presence of microemulsified seed particles, or micelles, of a liquid perfluorinated hydrocarbon that is a saturated aliphatic or aromatic organic compound having up to 2 oxygen, nitrogen, or sulfur atoms and a molecular weight preferably below 500.

The polymer particles so produced are usually small, being on the order of an average size of 1 to 80 nanometers (0.001 to 0.080 micrometers), preferably 1 to 60 nanometers and most preferably 1 to 30 nanometers. It is believed that such unusually small polymer particles are obtained because polymerization of the gaseous TFE takes place inside the very small micelles of the hydrocarbon organic compound in the microemulsion.

The perfluorinated hydrocarbon is a low molecular weight compound that is liquid at the temperature at which polymerization is carried out. The molecular weight is preferably less than 500. The perfluorinated hydrocarbon preferably has a boiling point less than 230° C. The perfluorinated hydrocarbon can be a perfluorinated saturated aliphatic compound such as a perfluorinated alkane; a perfluorinated aromatic compound such as perfluorinated benzene, or perfluorinated tetradecahydro phenanthene. It can also be a perfluorinated alkyl amine such as a perfluorinated trialkyl amine. It can also be a perfluorinated cyclic aliphatic, such as decalin; and preferably a heterocyclic aliphatic compound containing oxygen or sulfur in the ring, such as perfluoro-2-butyl tetrahydrofuran.

Examples of perfluorinated hydrocarbons include perfluoro-2-butyl tetrahydrofuran, perfluorodecalin, perfluoromethyldecalin, perfluorodimethyldecalin, perfluoromethylcyclohexane, perfluoro(1,3-dimethylcyclohexane), perfluorodimethyldecahydronaphthalene, perfluorofluoorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(t-ributylamine), or perfluoro(tripentylamine), and octafluorotoluene, hexafluorobenzene, and commercial fluorinated solvents, such as Fluorinert FC-75 produced by 3M. The fluorinated alkanes can be linear or branched, with a carbon atom number between 3 and 20. Oxygen, nitrogen or sulfur atoms can be present in the molecules, but the number of such atoms per molecule should be 2 or less.

The preparation of the microemulsion depends on careful selection of the ingredients. The microemulsion is prepared by mixing water, perfluorinated hydrocarbon, fluorinated surfactant(s), and optionally cosolvents or inorganic salts. The amounts employed are 0.1–40 weight percent, preferably 0.1–20, of the perfluorinated hydrocarbon; 0.1–40 weight percent, preferably 0.1–25, of the surfactant; and optionally cosurfactants; with the remainder water. The microemulsified perfluorinated hydrocarbons are believed to serve as microreactors for fluorinated monomers to enter and to be polymerized. The average particle size of the microemulsions can be in the range of 1 to 80 nanometers, preferably 1 to 60, most preferably 1 to 30. The temperature of the microemulsion formation can be between 0° to 150° C., preferably 40° to 100° C.

The fluorinated surfactant has the structure $R_f$E X, where $R_f$ is a fluorinated alkyl group with a carbon number between 4 and 16, E is an alkylene group with a carbon number between 0 and 4, and X is an anionic salt such as COOM, $SO_3M$, $SO_3NR_2$, $SO_4M$, a cationic moiety such as quarternary ammonium salt, or an amphoteric moiety such as aminoxide, or a non-ionic moiety such as $(CH_2CH_2O)_nH$; and M is H, Li, Na, K, or $NH_4$; R is a 1 to 5C alkyl group and n is a cardinal number of 2 to 40.

When tetrafluoroethylene is referred to herein, it is understood the term includes the so-called modified "homopolymer", in which the polymer chain includes very small amounts of units derived from perfluorol(propyl vinyl ether) or hexafluoropropylene.

To initiate polymerization, the temperature of the microemulsion is adjusted to between 0° and 150° C., preferably 40° to 100° C. Initiators for polymerization include free-radical initiators, such as persulfates, azo initiators, peroxides, or photo initiators which can generate free radicals by ultraviolet or gamma rays. Amount of initiators present can range between 0.001 to 5 percent by weight based on the final polymer content. Cosolvents such as an alcohol, amines or other amphiphilic molecules, or salt can be employed if desired to facilitate formation of the microemulsion.

Tetrafluoroethylene is introduced to the reactor from the vapor phase into the aqueous microemulsion phase. Sufficient mixing between liquid and vapor phase is important to encourage mass transfer. The mechanism of forming the ultra small polymer particles is not fully understood. It is believed that the higher the solubility of the tetrafluoroethylene monomer in the perfluorinated hydrocarbon, the better to achieve the original microemulsion particle size and shape. The time of reaction may be between 1 and 500 minutes.

The resulting polymer particles in the resulting dispersion have an average particle size of between 1 and 80 nanometers, preferably 1 to 60, most preferably 1 to 30, and a polymer average molecular weight of over 100,000, preferably over 1,000,000. The unusually small particle size provides a polymer system with a number of advantages over systems containing larger particles. The system is an aqueous colloidal dispersion, and is clear rather than turbid.

A small amount of units from comonomers may be present in the polymer, provided the amount of comonomer that can be present is not so great as to change the nature of the product that would be obtained if PTFE had been the product. In other words, the copolymer is still not melt processible. The comonomer can be a halogenated (chlorine or fluorine) olefin of 2–18 carbon atoms, for example vinyl chloride, vinylidene chloride, chlorotrifluoroethylene, hexafluoropropylene, perfluoroalkyl vinyl ether, or the like; hydrogenated unsaturated monomers, such as ethylene, propylene, isobutylene, vinyl acetate, acrylates, or the like; crosslinking agents, such as glycidylvinylether, chloroalkyl vinyl ether, allyl-glycidylether, acrylates, methacrylates, or the like.

MICROEMULSION POLYMERIZATION PROCEDURE FOR PRODUCING SMALL PARTICLES OF MELT PROCESSIBLE FLUOROPOLYMER PARTICLES

An aqueous microemulsion polymerization procedure produces unusually small particles of melt-processible fluoropolymers. During this procedure, the polymerization is carried out in the presence of microemulsified seed particles, or micelles, of a liquid perfluorinated hydrocarbon that is a saturated aliphatic or aromatic organic compound having up to two oxygen, nitrogens, or sulfur atoms and a molecular weight preferably below 500.

The polymer particles so produced are usually small, being on the order of one average size of 1 to 80 nanometers (0.001 to 0.080 micrometers,) preferably 1 to 60 nanometers and most preferably 1 to 30 nanometers. It is believed that such unusually small polymer particles are obtained because polymerization takes place inside the very small micelles of the hydrocarbon organic compound in the microemulsion.

The perfluorinated hydrocarbon is a low molecular weight compound that is liquid at the temperature at which polymerization is carried out. The molecular weight is preferably less than 500. The perfluorinated hydrocarbon preferably has a boiling point less than 230° C. The perfluorinated hydrocarbon can be a perfluorinated saturated aliphatic compound such as a perfluorinated alkane; a perfluorinated aromatic compound such as perfluorinated benzene, or perfluorinated tetradecahydro phenanthene. It can also be a perfluorinated alkyl amine such as a perfluorinated trialkyl amine. It can also be a perfluorinated cyclic aliphatic, such as decalin; and preferably a heterocyclic aliphatic compound containing oxygen or sulfur in the ring, such as perfluoro-2-butyl tetrahydrofuran.

Examples of perfluorinated hydrocarbons include perfluoro-2-butyltetrahydrofuran, perfluorodecalin, perfluoromethyldecalin, perfluorodimethyldecalin, perfluoromethylcyclohexane, perfluoro(1,3-dimethylcyclohexane), perfluorodimethyldecahydronaphthalene, perfluorofluoorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75 produced by 3M. The fluorinated alkanes can be linear or branched, with a carbon atom number between 3 and 20. Oxygen, nitrogen or sulfur atoms can be present in the molecules, but the number of such atoms per molecule should be two or less.

The preparation of the microemulsion depends on careful selection of the ingredients. The microemulsion is prepared by mixing water, perfluorinated hydrocarbon, fluorinated surfactant(s), and optionally cosolvents or inorganic salts. The amounts employed are 0.1–40 weight percent, preferably 0.1–20, of the perfluorinated hydrocarbon; 1–40 weight percent, preferably 0.1–25, of the surfactant; and optionally cosurfactants; with the remainder water. The microemulsified perfluorinated hydrocarbons are believed to serve as microreactors for fluorinated monomers to enter and to be polymerized. The average particle size of the microemulsions can be in the range of 1 to 80 nanometers, preferably 1 to 60, most preferably 1 to 30. The temperature of the microemulsion formation can be between 0° to 150° C., preferably 40° to 100° C.

The fluorinated surfactant has the structure $R_f$ E X, where $R_f$ is a fluorinated alkyl group with a carbon number between 4 and 16, E is an alkylene group with a carbon number between 0 and 4, and X is an anionic salt such as COOM, $SO_3M$, $SO_3NR_2$, $SO_4M$, a cationic moiety such as quarternary ammonium salt, or an amphoteric moiety such as aminoxide, or a non-ionic moiety such as $(CH_2CH_2O)_nH$; and M is H, Li, Na, K, or $NH_4$; R is a 1 to 5C alkyl group and n is a cardinal number of 2 to 40.

The polymerizable fluorinated monomers that are other than tetrafluoroethylene, include hexafluoroethylene, perfluoro alkyl vinyl ether, trifluoroethylene, vinylidene fluoride, vinyl fluoride, chlorotrifluoroethylene. Nonfluorinated monomers can be used as comonomers, such as vinylidene chloride, vinyl chloride, ethylene, propylene, butadiene. The monomer is preferably free-radical polymerizable, and preferably is ethylenically unsaturated.

To initiate polymerization, the temperature of the microemulsion is adjusted to between 0° and 150° C., preferably 40° to 100° C. Initiators for polymerization include free-radical initiators, such as persulfates, azo initiators, peroxides, or photo initiators which can generate free radicals by ultraviolet or gamma rays. Amount of initiators present can range between 0.001 to 5 percent by weight based on the final polymer content. Cosolvents such as an alcohol, amines or other amphiphilic molecules, or salt can be employed if desired to facilitate formation of the microemulsion.

The fluorinated gaseous monomers are introduced to the reactor from the vapor phase into the aqueous microemulsion phase. Sufficient mixing between liquid and vapor phase is important to encourage mass transfer. The mechanism of forming the ultra small fluorinated melt-processible polymer particles in this invention is not fully understood. It is believed that the higher the solubility of the monomers in the perfluorinated hydrocarbon, the better to achieve the original microemulsion particle size and shape. The time of reaction may be between 1 and 500 minutes.

The resulting polymer particles in the resulting dispersion have an average particle size of between 1 and 80 nanometers, preferably 1 to 60, most preferably 1 to 30, and a polymer average molecular weight of over 100,000, preferably over 1,000,000. The unusually small particle size provides a polymer system with a number of advantages over systems containing larger particles. The system is an aqueous colloidal dispersion and is clear rather than turbid.

MICROEMULSION POLYMERIZATION PROCEDURE FOR PRODUCING SMALL PARTICLES OF A POLYMER HAVING FLUOROALKYL SIDE CHAINS

The preparation of an aqueous dispersion of polymeric particles having fluoroalkyl side chains depends on careful selection of the ingredients of the monomeric microemulsion from which the polymers are made. Such a monomeric microemulsion is prepared by mixing water, unsaturated organic monomers having pendant fluoroalkyl groups, fluorosurfactants, and optionally, co-solvents or inorganic salts. The amounts employed are 1–40 weight percent, preferably 5–15, fluorinated monomer; 1–40 weight percent, preferably 5–25, of the surfactant; with the remainder water.

Additional monomers can be present to make copolymers, but the monomers having pendant perfluoroalkyl groups should comprise at least 30, preferably 50, and most preferably 70, weight percent of the total monomer content. Examples of additional monomers include unsaturated organic hydrocarbons, such as olefins; and nonfluorinated acrylic or methacrylic monomers. It is desirable in some instances to add a crosslinking agent. A wide range of crosslinking monomers can be present, including monomers having functional groups and/or unsaturated groups that can form covalent bonds through an addition or condensation reaction. Examples include allylglycidyl ether, perfluoroalkyl maleic acid ester, N-methylol acrylamide, N-methylol methacrylamide, glycidyl acrylate, glycidyl methacrylate, azetidinyl acrylate, azetidinyl methacrylate, diacetone acrylamide, diacetone methacrylamide, methylolated diacetone acrylamide, methylolated diacetone methacrylamide, ethylene diacrylate, ethylene dimethacrylate, hydroxyalkyl acrylate, and hydroxyalkyl methacrylate.

Representative organic monomers having pendant perfluoroalkyl groups include fluoroalkyl acrylates and fluoroalkyl methacrylates having terminal perfluoroalkyl groups of the formula:

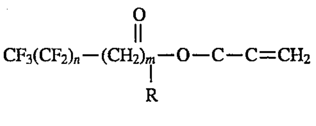

wherein n is a cardinal number of 1–21, m is a cardinal number of 1–10, and R is H or $CH_3$; fluoroalkyl aryl urethanes, for example

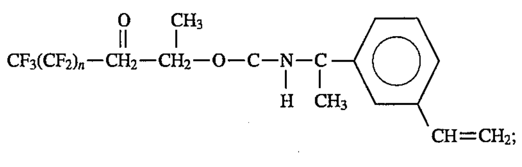

fluoroalkyl allyl urethanes, for example $$CF_3(CF_2)n-CH_2CH_2-O-\overset{\overset{O}{\|}}{C}-\underset{\underset{H}{|}}{N}-CH_2-CH=CH_2;$$

fluoroalkyl maleic acid esters, for example $$CF_3(CF_2)_n-CH_2CH_2-O-\overset{\overset{O}{\|}}{C}-CH=CH-COOH;$$

fluoroalkyl urethane acrylates; fluoroalkyl acrylamides; fluoroalkyl sulfonamide acrylates and the like.

It is understood that in the perfluorinated alkyl end group $CF_3(CF_2)_n$ it is difficult to prepare a compound in which n is a single numeral and that the end group is commonly a mixture of groups having varying chain lengths in which n is a mixture of predominantly 5, 7, 9 and 12.

The fluorinated surfactants used have the general formula $R_f$ R Y X, where $R_f$ is a perfluoroalkyl group or a perfluoroalkylether group with carbon number from 1 to 15 and preferably from 6 to 9 and R is for example an alkylene group or an alkylene thioether ($-CH_2-S-CH_2-$) linkage with carbon number from 0 to 4. For fluoridated anionic surfactants, Y is for example a carboxylate group (COO—), sulfonic group ($SO_3$—), or sulfate group ($SO_4$—) and X is an alkaline metal ion or ammonium ion. For fluorinated nonionic surfactants, Y is for example an oxyethylene $(OCH_2CH_2)m$ linkage where m is an integer from 1 to 15 and preferably from 3 to 9 and X is a hydroxyl group. For fluorinated cationic surfactants, YX is for example a quaternary ammonium salt.

To polymerize the microemulsion described above, the temperature of the monomeric microemulsion is adjusted to between 5° and 100° C., preferably 5°–80° C., and free radical producing polymerization initiator added. preferred initiators include persulfates, azo initiators, for example 2,2-azobis (2-amidopropane) dihydrochloride; peroxides, or photo initiators such as ultraviolet initiators and gamma ray initiators. Amounts of initiators present can range from 0.01 to 10 percent by weight based on monomer content. Cosolvents such as an alcohol, amines or other amphophilic molecules, or salt can be employed if desired to facilitate formation of the microemulsion.

Introduction of the initiator causes polymerization of the monomer to begin and the reaction proceeds. The resulting polymer particle latex has an average particle size of between 0.01 and 0.1 micrometers, preferably from 0.01 to 0.05 and most preferably less than 0.04 or 0.03 micrometers, and a polymer average molecular weight of over 10,000, preferably over 50,000. The unusually small particle size provides a polymer system with a number of advantages over systems containing larger particles. The system is a colloidal dispersion and is usually clear rather than turbid.

Without intending to limit the scope of the present invention, the apparatus and method of production of the present invention may be better understood by referring to the following examples:

EXAMPLE 1

A 400 ml glass beaker was lined with nickel foil (99.5% Alpha Aesar). The foil was cut such that a tab extended outside the beaker suitable for electrical connections. A DC power supply (HPE3615A Hewlett packard 0-20 VDC) provided the requisite DC voltage. A negative lead was attached to the nickel foil electrode and a positive lead was connected to a 48 AWG silver plated copper wire. The silver plated copper wire was suspended from a insulated ring stand into the center of a beaker. The beaker contained a PTFE dispersion which consisted of 30% solids by weight with an average particle size of 0.2 μm. The lower end of the wire was tied to a ¼-20 stainless steel hex nut to keep the wire vertical in the beaker. A DC voltage of 10 V was applied for 10 seconds. When the wire was withdrawn from the beaker, a gelatinous deposit was observed on the wire. The coated wire was then dried in a convection oven at 180° C. After the wire had dried, the wire was then heated to an air temperature of about 540° C. (using a heat gun) until sintering was observed. The resulting thickness of the coating was 177.8 μm in the region of the wire which was surrounded by the counter electrode.

EXAMPLE 2

A 44 AGW stainless steel wire was coated using the same procedure described in Example 1, except a DC voltage of 5 volts was applied instead of 10 volts. The resulting thickness of the coating was 25 μm of PTFE.

EXAMPLE 3

A 1.25 inch diameter glass tube with one closed end was lined with nickel foil (99.5%) Alpha Aesar. The tube was filled with an FEP microemulsion consisting of 30% solids by weight with an average particle size of 0.02 μm. A 48 AWG silver wire was suspended into the beaker. A potential of 1 volt DC was applied for 10 seconds. The wire was withdrawn from the bath and was baked at 150° C. for 30 seconds. The coating was then sintered at an air temperature of about 540° C. The resulting coating was continuous and had a thickness of 10 μm.

EXAMPLE 4

A 1.25 inch diameter glass tube with one closed end was lined with nickel foil (99.5%) Alpha Aesar. The tube was filled with an FEP microemulsion consisting of 30% solids by weight with an average particle size of 0.02 μm. A 48 AWG silver wire was suspended into the beaker. A potential of 0.8 volts DC was applied for 10 seconds. The wire was withdrawn from the bath and was baked at 150° C. for 30 seconds. The coating was then sintered at an air temperature of about 540° C. The resulting coating was continuous and had a thickness of 4 μm.

EXAMPLE 5

A 1.25 inch diameter glass tube with one closed end was lined with nickel foil (99.5%) Alpha Aesar. The tube was filled with a microemulsion PTFE consisting of 14% solids by weight with an average particle size of 0.02 μm. A 48 AWG silver wire was suspended into the beaker. A potential of 0.8 volts DC was applied for 10 seconds. The wire was withdrawn from the bath and was baked at 150° C. for 30 seconds. The coating was then sintered at an air temperature of about 540° C. The resulting coating was continuous and had a thickness of 2 μm and continuous as best illustrated by reference to FIG. 3.

EXAMPLE 6

A 1.25 inch diameter glass tube with one closed end was lined with nickel foil (99.5%) Alpha Aesar. The tube was filled with a microemulsion of fluoromethyacrylate consisting of 22% solids by weight with an average particle size of 0.02 μm. A 48 AWG silver wire was suspended into the beaker. A potential of 0.8 volts DC was applied for 10 seconds. The wire was withdrawn from the bath and was baked at 150° C. for 30 seconds. The coating was then sintered at an air temperature of about 540° C. The resulting coating was continuous and had a thickness of 0.8 μm as best seen by reference to FIGS. 5 and 6.

EXAMPLE 7

A 1.25 inch diameter glass tube with one closed end was lined with nickel foil (99.5%) Alpha Aesar. The tube was filled with a microemulsion of polybutylmethacrylate consisting of 22.5% solids (by weight) with an average particle size of 0.02 μm. A 48 AWG silver wire was suspended into the beaker. A potential of 2.8 volts DC was applied for 10 seconds. The wire was withdrawn from the bath and was baked at 150° C. for 30 seconds. The coating was then sintered at an air temperature of about 540° C. The resulting coating was continuous and had a thickness of 0.5 μm as best seen by reference to FIGS. 1 and 2.

EXAMPLE 8

A 1.25 inch diameter glass tube with one closed end was lined with nickel foil (99.5%) Alpha Aesar. The tube was filled with a microemulsion of PTFE consisting of 14% solids by weight with an average particle size of 0.02 μm. A 48 AWG silver plated copper wire was suspended into the beaker. A potential of 5 volts DC was applied for 10 seconds. The wire was withdrawn from the bath and was baked at 150° C. for 30 seconds. The coating was then sintered at an air temperature of about 540° C. The resulting coating was continuous and had a thickness of 36 μm as best seen by reference to FIG. 4.

EXAMPLE 9

A 1.25 inch diameter glass tube with one closed end was lined with nickel foil (99.5%) Alpha Aesar. The tube was filled with a microemulsion of FEP consisting of 7% solids by weight with an average particle size of 0.02 μm. A 48 AWG silver plated copper wire was suspended into the beaker. A potential of 0.67 volts DC was applied for 10 seconds. The wire was withdrawn from the bath and was baked at 150° C. for 30 seconds. The coating was then sintered at an air temperature of about 540° C. The resulting coating was continuous and had a thickness of 0.5 μm as best seen by reference to FIGS. 7 and 8.

TEST PROCEDURES

Particle Size Determination

A COULTER N4MD particle size analyzer was used. The mean diameter is measured using light scattering method with helium laser at scattering angle of 90 degree. Each aqueous dispersion sample was diluted about 10,000 times with deionized water before measurement.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A method for manufacturing an insulated electrical conductor comprising the steps of:

providing a microemulsion consisting of from about 5 to about 35% solids by weight with an average particle size ranging from about 0.009 to about 0.09 μm;

electrophoretically precipitating a uniform substantially pinhole free insulation layer having a thickness of less than about 30 μm about the conductor;

heating said insulation layer until dried; and sintering the insulation layer.

2. A method as claimed in claim 1 further including the step of:

providing a microemulsion consisting of from about 5 to about 35% solids by weight with an average particle size ranging from about 0.009 to about 0.09 μm selected from a group consisting of: polytetrafluoroethylene, fluorinated ethylenepropylene copolymer, polybutylmethacrylate, fluoromethacrylate polymer, fluoropolymers, perfluoroalkoxy polymer, and polymers having fluoroakyl side chains.

3. An electrical conductor made by the process of claim 1.

4. The invention of claim 3, wherein the electrical conductor comprises a pair of wires.

5. The invention of claim 3, wherein the electrical conductor is a coaxial cable.

6. The invention of claim 3, wherein the electrical conductor is a ribbon cable.

* * * * *